(12) United States Patent
Gunasekaran et al.

(10) Patent No.: US 10,676,392 B2
(45) Date of Patent: Jun. 9, 2020

(54) TRANSPARENT CONDUCTING FILMS CONTAINING SINGLE-WALLED CARBON NANOTUBES DISPERSED IN AN AZO DYE

(71) Applicant: Wisconsin Alumni Research Foundation, Madison, WI (US)

(72) Inventors: Sundaram Gunasekaran, Madison, WI (US); Ashok Kumar Sundramoorthy, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 15/411,464

(22) Filed: Jan. 20, 2017

(65) Prior Publication Data

US 2017/0129804 A1 May 11, 2017

Related U.S. Application Data

(62) Division of application No. 14/701,599, filed on May 1, 2015, now abandoned.
(Continued)

(51) Int. Cl.
| | |
|---|---|
| *C09D 5/24* | (2006.01) |
| *H01B 5/14* | (2006.01) |
| *B82Y 40/00* | (2011.01) |
| *H01B 1/04* | (2006.01) |
| *C03C 17/00* | (2006.01) |

(Continued)

(52) U.S. Cl.
CPC .......... *C03C 17/009* (2013.01); *C03C 17/007* (2013.01); *C09D 1/00* (2013.01); *C09D 5/24* (2013.01); *C09D 7/40* (2018.01); *C09D 7/61* (2018.01); *C09D 7/63* (2018.01); *H01B 1/04* (2013.01); *H01B 5/14* (2013.01); *H01B 13/00* (2013.01); *H01B 13/0036* (2013.01);
(Continued)

(58) Field of Classification Search
CPC ... C01B 31/0273; C01B 2202/02; H01B 1/04; H01L 35/14; C09D 5/24; C03C 17/007; C03C 17/009
USPC ........ 252/502, 510; 977/742, 750, 748, 847; 106/472; 427/108
See application file for complete search history.

(56) References Cited

U.S. PATENT DOCUMENTS

| | | |
|---|---|---|
| 7,411,085 B2 | 8/2008 | Hirakata et al. |
| 8,048,490 B2 | 11/2011 | Watanabe et al. |

(Continued)

OTHER PUBLICATIONS

Imazu "Fabrication of flexible transparen conductive films from long double-walled carbon nanotubes." Sci. Technol. Adv. Mater. 15 (2014) 025005 (7pp) (Year: 2014).*
(Continued)

*Primary Examiner* — Tri V Nguyen
(74) *Attorney, Agent, or Firm* — Joseph T. Leone, Esq.; DeWitt LLP

(57) ABSTRACT

Described are carbon nanotube dispersions containing single-walled carbon nanotubes dispersed in a dispersant solution comprising a solvent (water, organic polar protic solvents, and/or organic polar aprotic solvents), and an azo compound. The single-walled carbon nanotubes are not cross-linked with covalent bonds. The dispersions are useful for fabricating transparent conductive thin films on flexible and inflexible substrates. Methods for making the transparent conductive thin films are also described.

9 Claims, 13 Drawing Sheets
(12 of 13 Drawing Sheet(s) Filed in Color)

Related U.S. Application Data

(60) Provisional application No. 61/986,973, filed on May 1, 2014.

(51) Int. Cl.

| | |
|---|---|
| H01B 13/00 | (2006.01) |
| C09D 7/40 | (2018.01) |
| C09D 7/61 | (2018.01) |
| C09D 7/63 | (2018.01) |
| C09D 1/00 | (2006.01) |
| C08K 3/04 | (2006.01) |

(52) U.S. Cl.
CPC .... *C03C 2217/465* (2013.01); *C03C 2217/70* (2013.01); *C08K 3/041* (2017.05)

(56) References Cited

U.S. PATENT DOCUMENTS

| | | | |
|---|---|---|---|
| 8,697,180 B2 | 4/2014 | Veerasamy | |
| 2004/0142285 A1* | 7/2004 | Jung | B82Y 10/00 430/315 |
| 2006/0045838 A1 | 3/2006 | Lucien Malenfant et al. | |
| 2008/0283875 A1* | 11/2008 | Mukasa | B82Y 10/00 257/253 |
| 2009/0218549 A1* | 9/2009 | Kato | H01B 1/04 174/254 |
| 2013/0108793 A1 | 5/2013 | Sivarajan et al. | |
| 2014/0308194 A1 | 10/2014 | Chan et al. | |

OTHER PUBLICATIONS

Liu ("Controlled Growth of Super-Aligned Carbon Nanotube Arrays for Spinning Continuous Unidirectional Sheets with Tunable Physical Properties." Nano Lett., vol. 8, No. 2, 2008) (Year: 2008) (Year: 2008).*

Seo "Photo-switchable molecular monolayer anchored between highly transparent and flexible graphene electrodes." Nature Communications, 4:1920 (Year: 2013).*

D. Angmo, F.C. Krebs, Flexible ITO-Free Polymer Solar Cells, *Journal of Applied Polymer Science* 129 (2013) 1-14.

S. De, P.E. Lyons, S. Sorel, E.M. Doherty, P.J. King, W.J. Blau, P.N. Nirmalraj, J.J. Boland, V. Scardaci, J. Joimel, J.N. Coleman, Transparent, Flexible, and Highly Conductive Thin Films Based on Polymer—Nanotube Composites, *Acs Nano* 3 (2009) 714-720.

M.F.L. De Volder, S.H. Tawfick, R.H. Baughman, A.J. Hart, Carbon Nanotubes: Present and Future Commercial Applications, *Science* 339 (2013) 535-540.

K. Ellmer, Past achievements and future challenges in the development of optically transparent electrodes, *Nature Photonics* 6 (2012) 809-817.

P. Frid, S.V. Anisimov, N. Popovic, Congo red and protein aggregation in neurodegenerative diseases, *Brain Research Reviews* 53 (2007) 135-160.

H.J. Gao, R. Izquierdo, V.V. Truong, Chemical vapor doping of transparent and conductive films of carbon nanotubes, *Chemical Physics Letters* 546 (2012) 109-114.

S. Gotovac, C.M. Yang, Y. Hattori, K. Takahashi, H. Kanoh, K. Kaneko, Adsorption of polyaromatic hydrocarbons on single wall carbon nanotubes of different functionalities and diameters, Journal of Colloid and Interface *Science* 314 (2007) 18-24.

D.S. Hecht, L.B. Hu, G. Irvin, Emerging Transparent Electrodes Based on Thin Films of Carbon Nanotubes, Graphene, and Metallic Nanostructures, *Advanced Materials* 23 (2011) 1482-1513.

X.N. Ho, J. Wei, Films of Carbon Nanomaterials for Transparent Conductors, *Materials* 6 (2013) 2155-2181.

C.G. Hu, Z.L. Chen, A.G. Shen, X.C. Shen, H. Li, S.S. Hu, Water-soluble single-walled carbon nanotubes via noncovalent functionalization by a rigid, planar and conjugated diazo dye, *Carbon* 44 (2006) 428-434.

R. Jackson, B. Domercq, R. Jain, B. Kippelen, S. Graham, Stability of Doped Transparent Carbon Nanotube Electrodes, *Advanced Functional Materials* 18 (2008) 2548-2554.

H. Jung, J.S. Yu, H.P. Lee, J.M. Kim, J.Y. Park, D. Kim, a scalable fabrication of highly transparent and conductive thin films using fluorosurfactant-assisted single-walled carbon nanotube dispersions, *Carbon* 52 (2013) 259-266.

Koh, Fluorophore and Dye-Assisted Dispersion of Carbon Nanotubes in Aqueous Solution, *Langmuir*, 28, (2012) 11676-11676.

J. Lewis, Material challenge for flexible organic devices, *Materials Today* 9 (2006) 38-45.

F.H. Li, Y. Bao, J. Chai, Q.X. Zhang, D.X. Han, L. Niu, Synthesis and Application of Widely Soluble Graphene Sheets, *Langmuir* 26 (2010) 12314-12320.

J. Li, Y. Huang, P. Chen, M.B. Chan-Park, in Situ Charge-Transfer-Induced Transition from Metallic to Semiconducting Single-Walled Carbon Nanotubes, *Chemistry of Materials* 25 (2013) 4464-4470.

Q.F. Liu, T. Fujigaya, H.M. Cheng, N. Nakashima, Free-Standing Highly Conductive Transparent Ultrathin Single-Walled Carbon Nanotube Films, *Journal of the American Chemical Society* 132 (2010) 16581-16586.

F. Mirri, A.W.K. Ma, T.T. Hsu, N. Behabtu, S.L. Eichmann, C.C. Young, D.E. Tsentalovich, M. Pasquali, High-Performance Carbon Nanotube Transparent Conductive Films by Scalable Dip Coating, *Acs Nano* 6 (2012) 9737-9744.

R.R. Nayak, K.Y. Lee, A.M. Shanmugharaj, S.H. Ryu, Synthesis and characterization of styrene grafted carbon nanotube and its polystyrene nanocomposite, *European Polymer Journal* 43 (2007) 4916-4923.

M.H.A. Ng, L.T. Hartadi, H. Tan, C.H.P. Poa, Efficient coating of transparent and conductive carbon nanotube thin films on plastic substrates, *Nanotechnology* 19 (2008) 205703, 1-5.

S. Park, M. Vosguerichian, Z.A. Bao, A review of fabrication and applications of carbon nanotube film-based flexible electronics, *Nanoscale* 5 (2013) 1727-1752.

V. Sa, K.G. Kornev, Analysis of Stability of Nanotube Dispersions Using Surface Tension Isotherms, *Langmuir* 27 (2011) 13451-13460.

H.-J. Shin, S.M. Kim, S.-M. Yoon, a. Benayad, K.K. Kim, S.J. Kim, H.K. Park, J.-Y. Choi, Y.H. Lee, Tailoring Electronic Structures of Carbon Nanotubes by Solvent with Electron-Donating and -Withdrawing Groups, *Journal of the American Chemical Society* 130 (2008) 2062-2066.

Stopa, B. et al., the structure and protein binding of amyloid-specific dye reagents, Acta Biochimica Polonica 50 (2003) 1213-1227.

A.K. Sundramoorthy, S. Mesgari, J. Wang, R. Kumar, M.A. Sk, S.H. Yeap, Q. Zhang, S.K. Sze, K.H. Lim, M.B. Chan-Park, Scalable and Effective Enrichment of Semiconducting Single-Walled Carbon Nanotubes by a Dual Selective Naphthalene-Based Azo Dispersant, *Journal of the American Chemical Society* 135 (2013) 5569-5581.

R.C. Tenent, T.M. Barnes, J.D. Bergeson, A.J. Ferguson, B. To, L.M. Gedvilas, M.J. Heben, J.L. Blackburn, Ultrasmooth, Large-Area, High-Uniformity, Conductive Transparent Single-Walled-Carbon-Nanotube Films for Photovoltaics Produced by Ultrasonic Spraying, *Advanced Materials* 21 (2009) 3210-3216.

E.E. Tkalya, M. Ghislandi, G. De With, C.E. Koning, the use of surfactants for dispersing carbon nanotubes and graphene to make conductive nanocomposites, *Current Opinion in Colloid & Interface Science* 17 (2012) 225-232.

T.P. Tyler, R.E. Brock, H.J. Karmel, T.J. Marks, M.C. Hersam, Electronically Monodisperse Single-Walled Carbon Nanotube Thin Films as Transparent Conducting Anodes in Organic Photovoltaic Devices, *Advanced Energy Materials* 1 (2011) 785-791.

L. Vaisman, H.D. Wagner, G. Marom, the role of surfactants in dispersion of carbon nanotubes, *Advances in Colloid and Interface Science* 128-130 (2006) 37-46.

Van Der Pauw, L.J. (1958) "A method of measuring the resistivity and Hall coefficient on lamellae of arbitrary shape," *Philips Technical Review* 20:220-224.

S.B. Yang, B.S. Kong, D.H. Jung, Y.K. Baek, C.S. Han, S.K. Oh, H.T. Jung, Recent advances in hybrids of carbon nanotube network films and nanomaterials for their potential applications as transparent conducting films, *Nanoscale* 3 (2011) 1361-1373.

(56) References Cited

OTHER PUBLICATIONS

S.B. Yang, B.S. Kong, H.T. Jung, Multistep Deposition of Gold Nanoparticles on Single-Walled Carbon Nanotubes for High-Performance Transparent Conducting Films, *Journal of Physical Chemistry C* 116 (2012) 25581-25587.

J.H. Yim, Y.S. Kim, K.H. Koh, S. Lee, Fabrication of transparent single wall carbon nanotube films with low sheet resistance, *Journal of Vacuum Science & Technology B* 26 (2008) 851-855.

W. Zhang, S.R.P. Silva, Raman and FT-IR studies on dye-assisted dispersion and flocculation of single walled carbon nanotubes, *Spectrochimica Acta Part A: Molecular and Biomolecular Spectroscopy* 77 (2010) 175-178.

\* cited by examiner

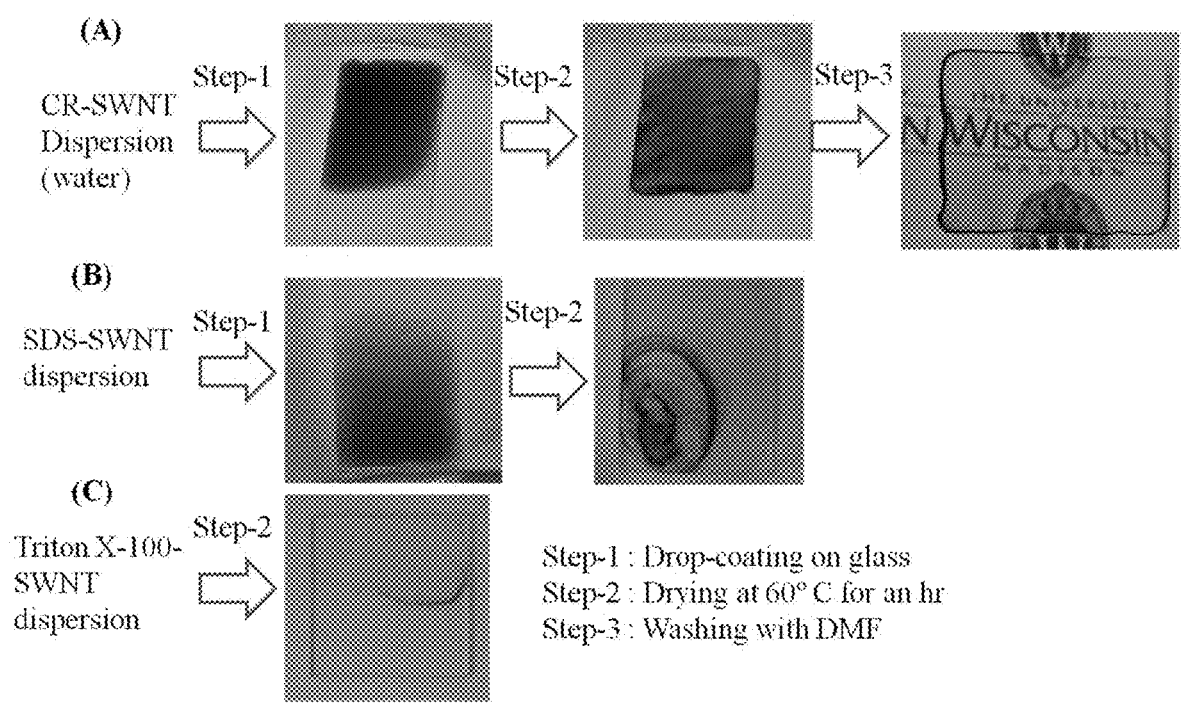
FIG. 2B (middle)
FIG. 2C (bottom)

FIG. 3A
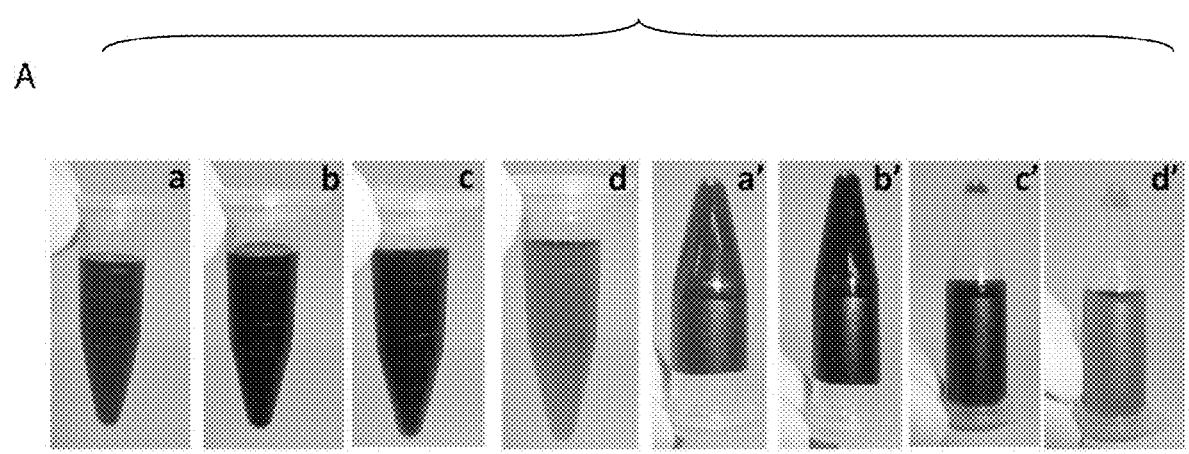
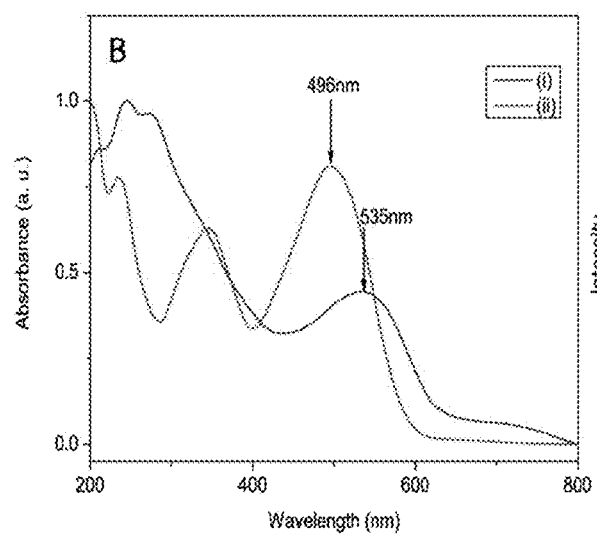
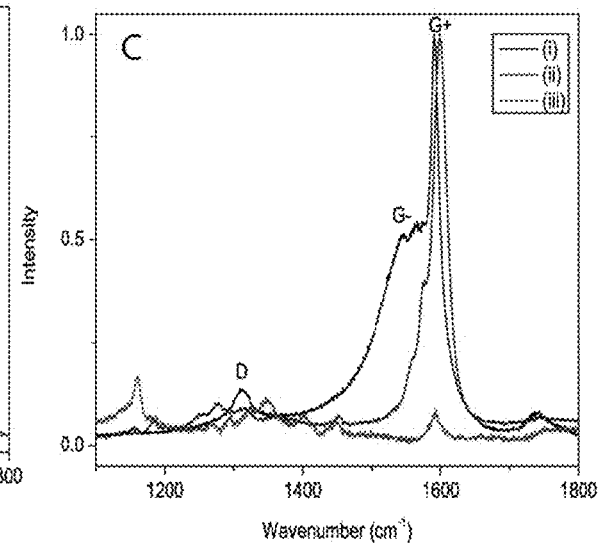
FIG. 3B  FIG. 3C

FIG. 5A
FIG. 5B
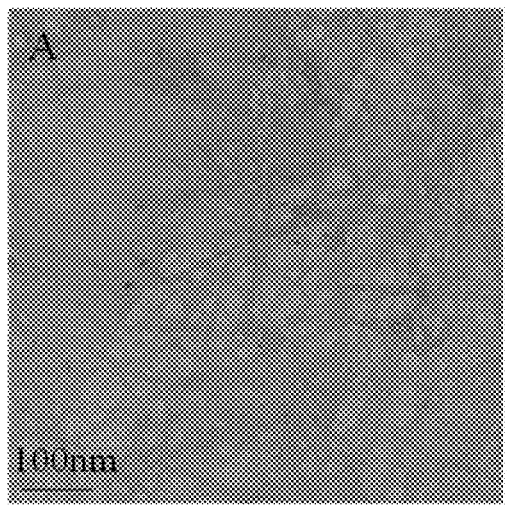
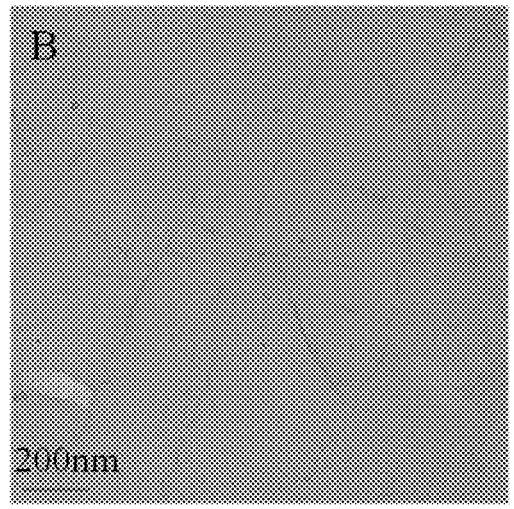
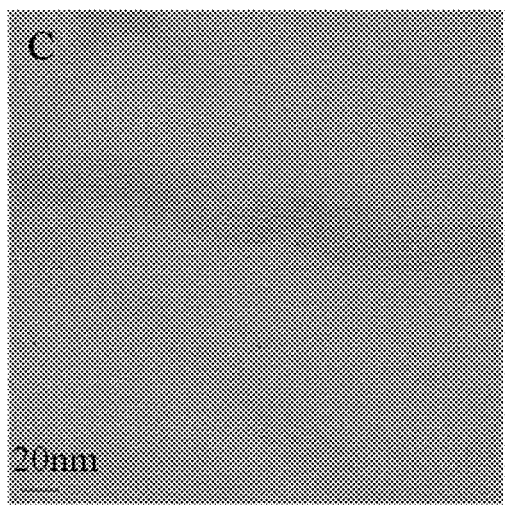
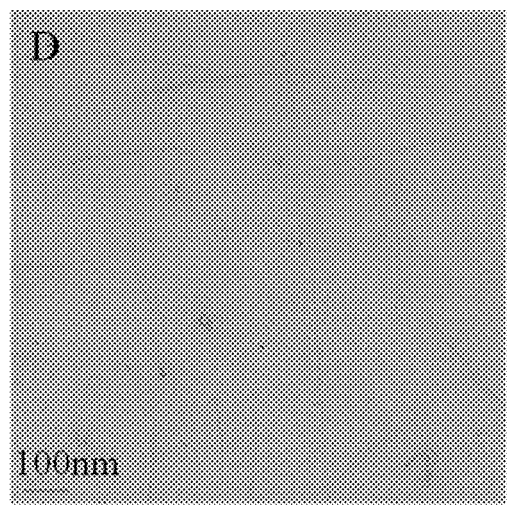
FIG. 5C
FIG. 5D

FIG. 6A  FIG. 6B
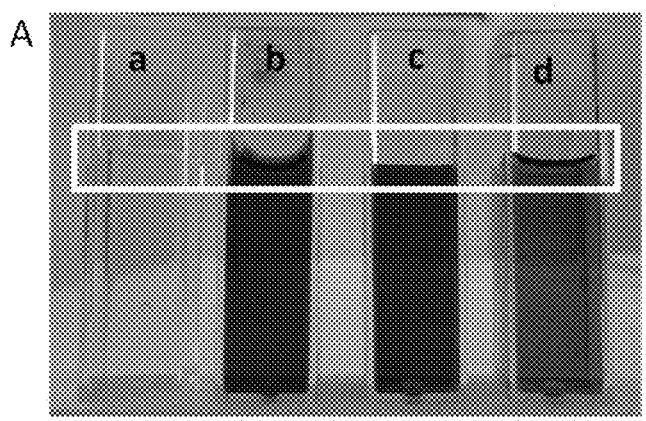 
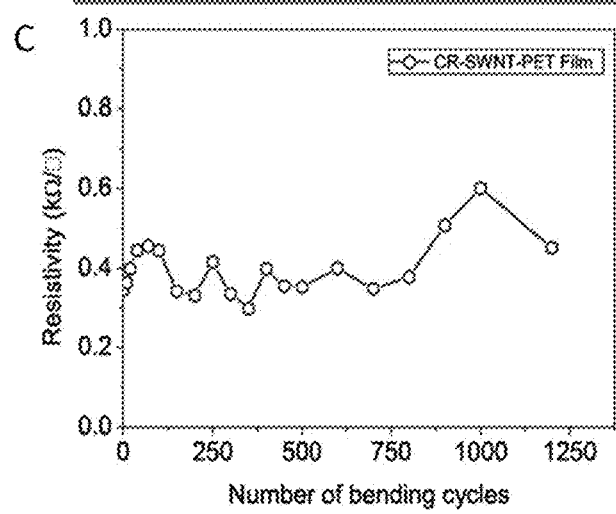 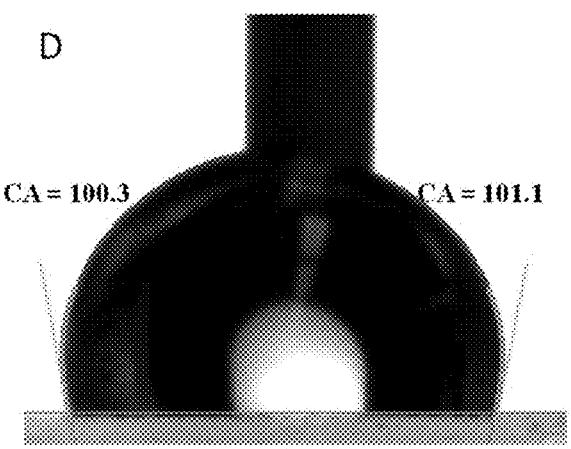
FIG. 6C  FIG. 6D

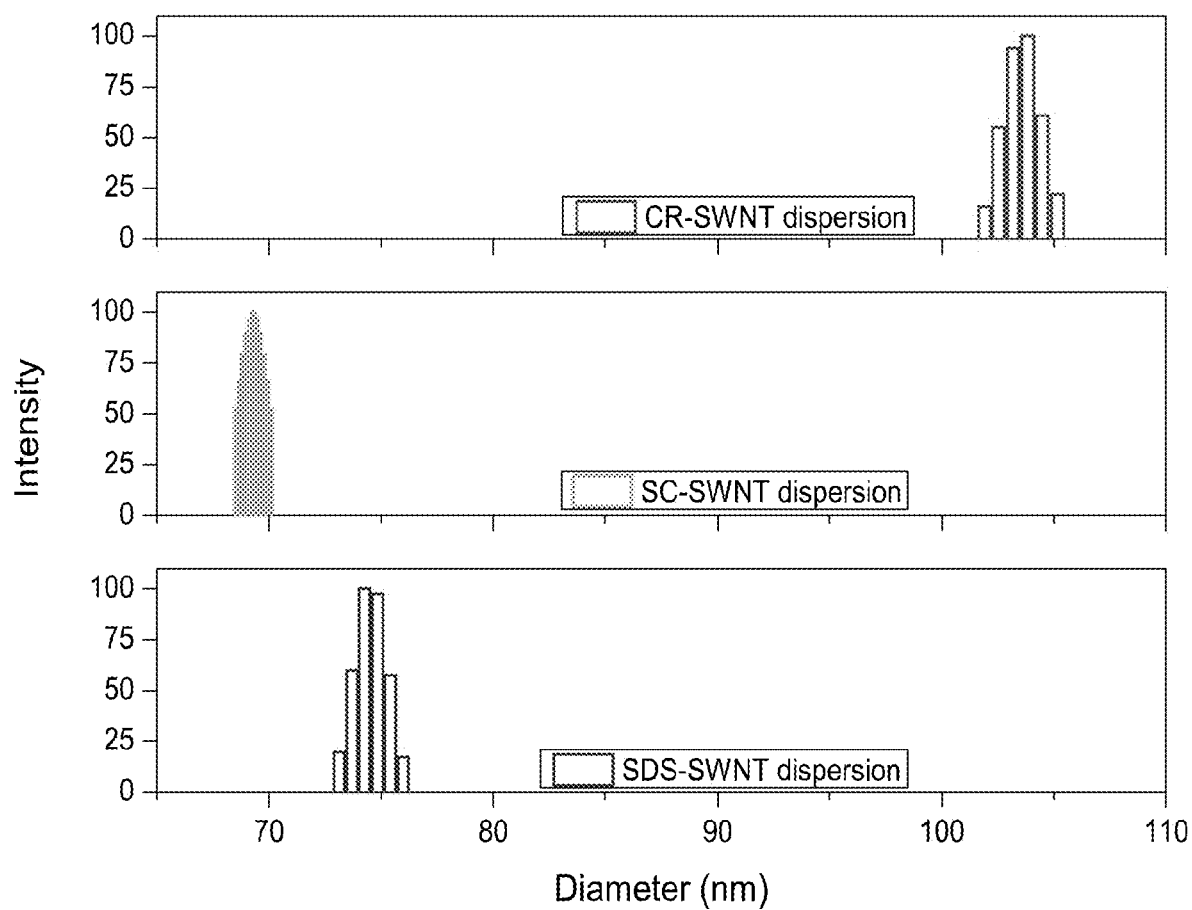
FIG. 7A (top)
FIG. 7B (middle)
FIG. 7C (bottom)

FIG. 10A
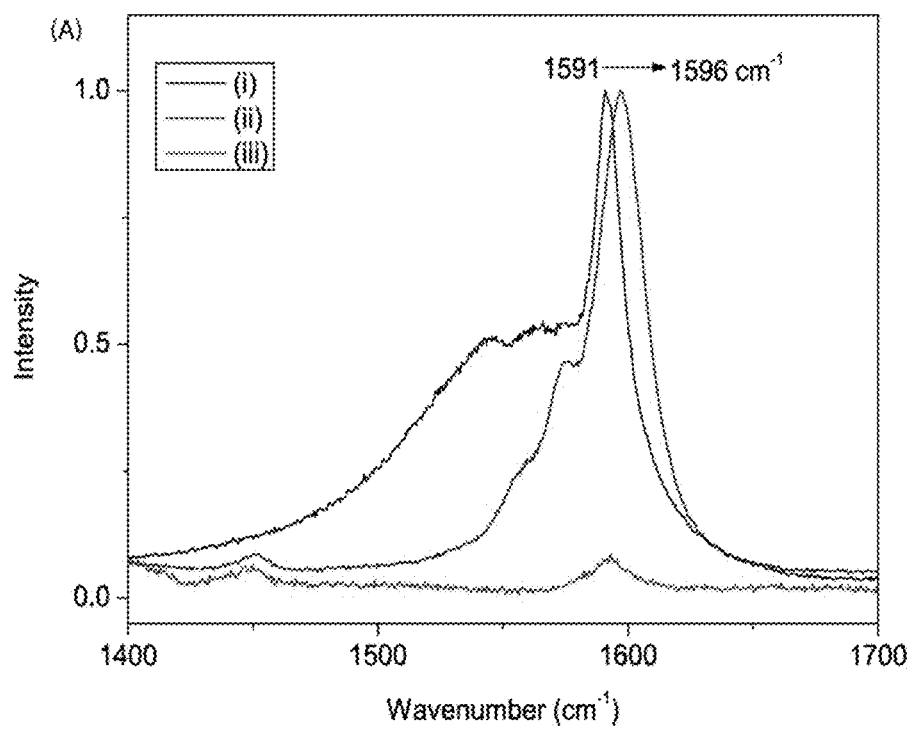
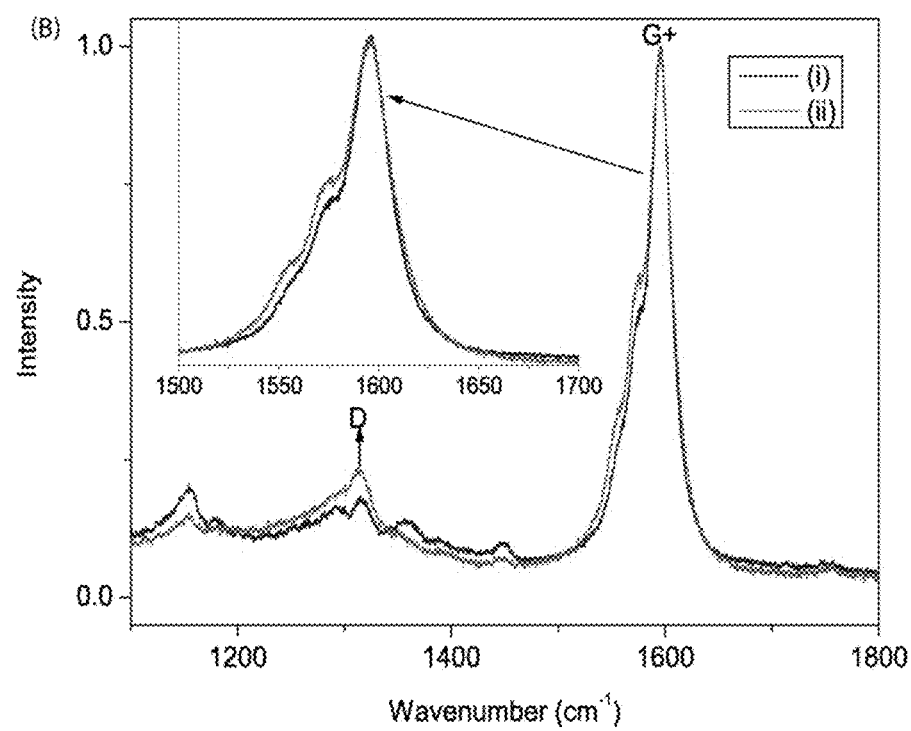
FIG. 10B

FIG. 12A
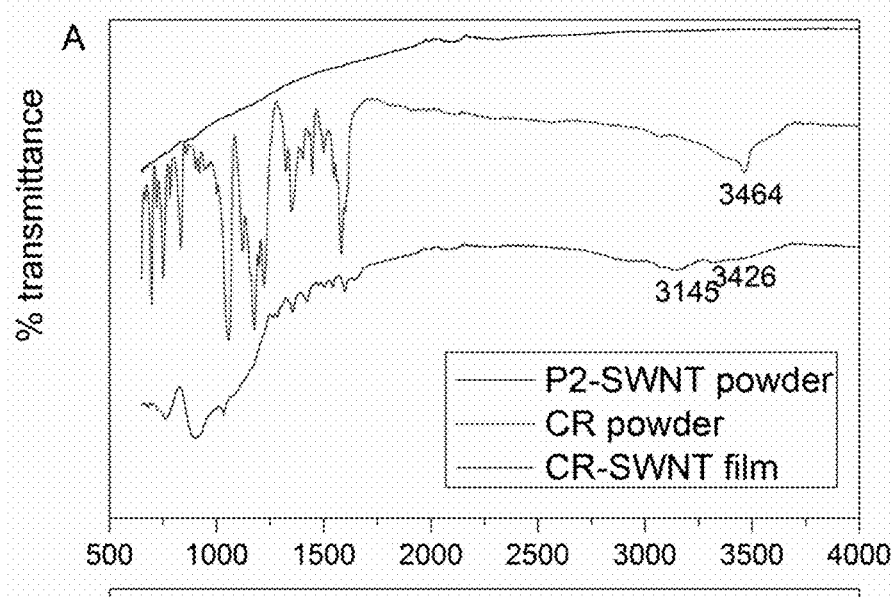
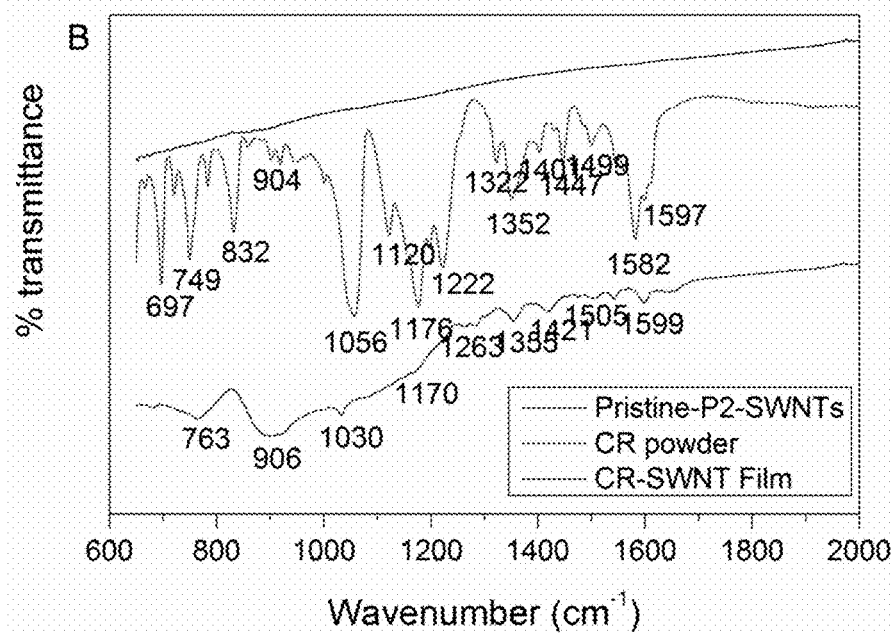
FIG. 12B

FIG. 13A
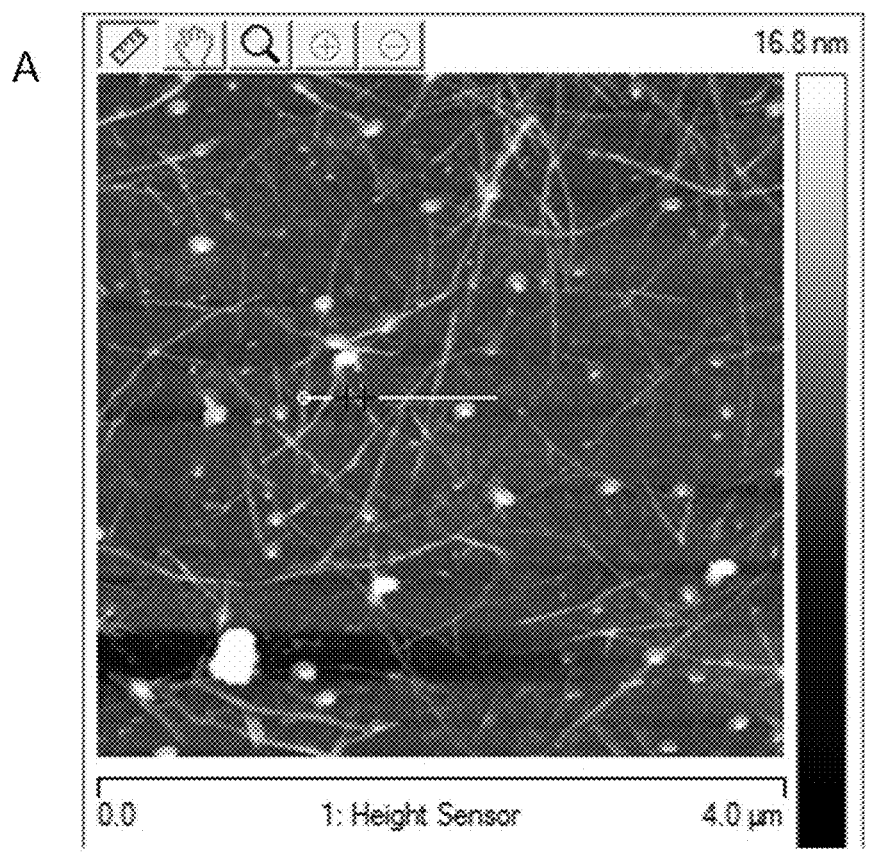
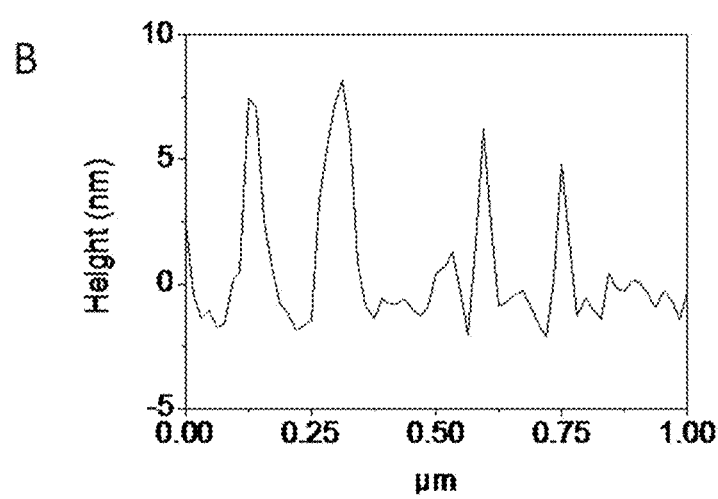
FIG. 13B

TRANSPARENT CONDUCTING FILMS CONTAINING SINGLE-WALLED CARBON NANOTUBES DISPERSED IN AN AZO DYE

CROSS-REFERENCE TO RELATED APPLICATIONS

This is a divisional of co-pending application Ser. No. 14/701,599, filed May 1, 2015, which claims priority to provisional application Ser. No. 61/986,973, filed May 1, 2014, both of which are incorporated herein by reference.

FEDERAL FUNDING STATEMENT

This invention was made with government support under 14-CRHF-0-6055 awarded by the USDA/NIFA. The government has certain rights in the invention.

FIELD OF THE INVENTION

Described herein are flexible, transparent conducting thin film comprising carbon nanotubes dispersed in an azo compound such as Congo red. Also described herein are methods to make these flexible thin films.

BACKGROUND

The demand for high quality transparent conductive films (TCFs) is very high because of their use in flat panel displays, electrochromic windows, photovoltaic solar cells, hand-held devices, energy technologies, and biosensors [1]. Indium tin oxide (ITO) film-coated transparent conducting materials (TCM) are commonly employed in industrial applications where TCFs are needed. Typically, however, ITO thin films are applied to glass substrates. A glass substrate, of course, is inflexible and easily broken. Additionally, casting an ITO film of uniform thickness onto a curved glass substrate is quite difficult and expensive. ITO-based TCMs are widely used, however, because they afford relatively low sheet resistance (~20Ω/□) and fairly high transmittance (>80%) in the visible region of the solar spectrum[2]. In other words, TCFs having high conductivity and high transmittance in the visible spectrum are very desirable. However, due to increasing demand and limited availability, the cost of indium is on the rise [2]. ITO thin films can be formed on flexible substrates. However, ITO-based materials become brittle after only a few bending cycles; thus they are unsuitable for high flexibility applications.[3] As a consequence, many other materials, such as single-walled carbon nanotubes (SWNTs) [4-6] and their metal hybrids have been investigated as potential alternatives to ITO [7-9]. See also, for example, U.S. Pat. No. 8,697,180, issued Apr. 15, 2014, to Veerasamy; U.S. Pat. No. 8,048,490, issued Nov. 1, 2011, to Watanabe et al.; and U.S. Pat. No. 7,411,085, issued Aug. 12, 2008, to Hirakata et al.

As-synthesized SWNTs are highly hydrophobic bundles, which must be dispersed in a surfactant solution to take advantage of their many unique properties [10]. Methods to fabricate carbon SWNTs are well known in the art and will not be discussed herein. Carbon SWNTs can also be purchased from a large number of international commercial suppliers, such as Nanocyl s.a. (Sabreville, Belgium) and Nanostructured & Amorphous Materials, Inc. (Houston, Tex.). Dispersions of SWNTs can be formed into TCFs by spin-coating [11], dip-coating [12, 13], spray-coating [14], bar-coating [15] and by vacuum filtration [16, 17]. However, commonly known surfactants tend to stick to the SWNTs firmly, which significantly increases the inter-tube contact resistance. Removing any adhering surfactant by thermal annealing at high temperature is a prerequisite to reducing the sheet resistivity of SWNT films. However, annealing of SWNT films prepared on flexible substrates such as polyethylene terephthalate (PET) is not feasible. Thus, in conventional methods, the SWNT films are first prepared on a solid substrate that can withstand the heat off annealing. The film is then annealed on the solid substrate. After annealing, the film is then transferred from the solid substrate onto a flexible substrate. In short, preparing a flexible SWNT film with low resistivity and high transparency via conventional means is a challenging and laborious task.

There is thus a long-felt and unmet need for new methods or technologies to facilitate using thin flexible films SWNTs in various applications without the aforementioned laborious fabrication techniques.

SUMMARY

Single-walled carbon nanotubes (SWNTs) are known for their high conductivity, mechanical strength, transparency, and flexibility. These superior properties make SWNTs a potential candidate for use in next generation transparent electrodes. These types of electrodes are highly sought after for visual displays, touch screens, and energy-harvesting applications. However, to exploit the potential of SWNTs, they must be dispersed, i.e., debundled, in a surfactant solution for further processing and use. Disclosed and claimed herein is a novel method to prepare transparent conducting films (TCF) comprising SWNTs using an azo dye in water and/or an organic polar protic or polar aprotic solvent as the dispersant. The resulting TCF is not covalently cross-linked. The preferred azo dispersant is 3,3'-([1,1'-biphenyl]-4,4'-diyl)bis(4-aminonaphthalene-1-sulfonic acid), commonly known as Congo red (CR). It was found that SWNTs can be effectively dispersed in water by adding CR, which forms a stable dispersion (presumably by non-covalent adsorption). Using CR-SWNTs dispersion, SWNTs-based TCFs of uniform thickness were prepared (~20 nm) on rigid glass substrates and flexible polyethylene terephthalate (PET), and polydimethylsiloxane (PDMS) substrates by drop-coating. Spin-coating and other methods can also be used. UV-VIS-NIR spectroscopy (UV-VIS-NIR), Raman spectroscopy, Fourier transform infrared spectroscopy (FT-IR), transmission electron microscopy (TEM), scanning electron microscopy (SEM) and dynamic light scattering (DLS) measurements were employed to characterize the CR-SWNTs dispersion and the TCFs. The sheet resistance of the TCFs thus prepared was about 300 ohms per square (i.e., 300"Ω/□" or 300 "Ω/sq") on all of glass, flexible PET and PDMS substrates. Transmittance of the films on all substrates tested was about 82%, which is better than the transmittance of TCFs formed by dispersing SWNTs in the common surfactants sodium dodecyl sulfate (SDS), sodium cholate (SC), and polyethylene glycol p-(1,1,3,3-tetramethylbutyl)-phenyl ether-type nonionic surfactants (e.g., Triton™ X-100-brand surfactant). ("Triton" is a common law trademark of the Dow Chemical Company.) It is notable that TCFs are not formed using SWNTs dispersed in any of SDS, SC, or Triton X-100-brand surfactant by drop-coating.

The SWNTs-CR TCFs disclosed herein are useful for various indications such as in flexible electronics, indium-free electrodes, bio-sensing substrates, photovoltaic panels, and the like. In addition, the color and conductivity of SWNTs-CR film are dependent on the pH of the contact solution. This novel property can be exploited for rapid and visible detection of certain pathogens, toxins, and other analytes in biological, pharmaceutical, environmental, and food samples by integrating SWNT-CR TCFs with field-effect transistors.

Thus, disclosed herein is a method for preparing SWNT-based TCFs by using an azo dye such as 3,3'-([1,1'-biphenyl]-4,4'-diyl)bis(4-aminonaphthalene-1-sulfonic acid) (Congo red, CR) as a dispersant in aqueous solution and/or a solution comprising an organic polar protic or polar aprotic solvent. CR, a symmetrical linear molecule, is both soluble in water as well as in organic solvents (dimethylformamide (DMF) and ethanol). See FIG. 1B. The ability of CR to function as a dispersant for SWNTs was extensively studied by comparing it with that of common surfactants such as SDS, SC, and polyethylene glycol p-(1,1,3,3-tetramethylbutyl)-phenyl ether.

Further disclosed herein is a carbon nanotube dispersion comprising single-walled carbon nanotubes dispersed in a dispersant solution. The dispersant solution comprises a solvent comprising water, organic polar protic solvents, and/or organic polar aprotic solvents, and an azo compound comprising at least one azo moiety. The single-walled carbon nanotubes are not covalently cross-linked. The azo compound may optionally comprise at least two azo moieties. The azo compound may also optionally comprise at least one sulfonic acid moiety or at least two sulfonic acid moieties. Preferred azo compounds are selected from the group consisting of:

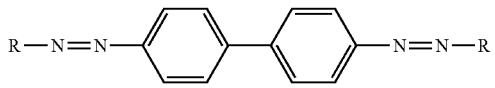

wherein each R is identical or different and each R is independently selected from the group consisting of amino-substituted phenyl and amino-substituted naphthyl. Optionally, at least one of the R substituents is further substituted with at least one sulfonic acid moiety. The most preferred azo compound is 3,3'-([1,1'-biphenyl]-4,4'-diyl)bis(4-aminonaphthalene-1-sulfonic acid (Congo red).

Also disclosed herein are flexible, transparent, conductive film fabricated from a carbon nanotube dispersion as disclosed herein.

Additionally disclosed herein is a method of making a flexible, transparent, conductive film. The method comprises providing a dispersion of single-walled carbon nanotubes in a solution comprising a solvent selected from the group consisting of water, organic polar protic solvents, and/or organic polar aprotic solvents, and an azo compound as described in the preceding paragraphs. The dispersion is then contacted on a substrate, and the solution is removed, typically by gentle heating. This yields a flexible, transparent, conductive film formed on the substrate. The single-walled carbon nanotubes are not cross-linked with covalent bonds.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations disclosed herein shall include the corresponding plural characteristic or limitation, and vice-versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The methods disclosed herein can comprise, consist of, or consist essentially of the essential elements and limitations of the method described herein, as well as any additional or optional ingredients, components, or limitations described herein or otherwise useful in synthetic organic chemistry.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A, 2B, and 2C depict various methods for preparing SWNT films. FIG. 2A shows preparation of SWNT films via drop-coating of a CR-SWNT dispersion. FIG. 2B shows preparation of SWNT films using drop-coating of a SDS-SWNT dispersion. FIG. 2C shows preparation of SWNT films using drop-coating of a polyethylene glycol p-(1,1,3,3-tetramethylbutyl)-phenyl ether (Triton X-100-brand)-SWNT dispersion. All films were cast on glass substrates.

FIG. 3A is a series of photographic images depicting a CR solution (a, a'); a CR-SWNT dispersion (b, b'); a SDS-SWNT dispersion (c, c'); and a Triton 100-X-brand-SWNT dispersion (d, d'). FIG. 3B depicts UV-VIS spectra of CR (i) and CR-SWNTs (ii) dispersions. FIG. 3C depicts Raman spectra of pristine-SWNTs (i); CR-SWNTs (ii); and CR (control) (iii) powder samples using a 633 nm excitation laser.

FIG. 5A is a TEM image of a CR-SWNT. FIG. 5B is a TEM image of a Supt-CR-SWNT dispersions. FIG. 5C is a TEM image of a bundle of SWNTs from CR-SWNT dispersion. FIG. 5D is a TEM image of SWNTs dispersed in SDS solution (control).

FIG. 6A is a photographic image of water (a), CR solution (b), CR-SWNTs dispersion (c), and SDS-SWNT dispersion (d). FIG. 6B is a photograph of conducting-transparent SWNT-coated PET substrate using CR-SWNT dispersion. FIG. 6C is a graph depicting changes in resistivity on the SWNT-PET film with subsequent bending cycles (each point is the mean of three measurements over the SWNT films after bending cycles). FIG. 6D is a water droplet on the CR-SWNT film with superimposed contact angle measurements.

FIG. 7A shows particle diameter measurements of CR-SWNT dispersion. FIG. 7B shows particle diameter measurements of SC-SWNT dispersion. FIG. 7C shows particle diameter measurements of SDS-SWNT dispersions.

FIG. 10A depicts Raman spectra of pristine-SWNTs (i), CR-SWNTs (ii), and CR (control) powder samples (iii). FIG. 10B depicts Raman spectra of CR-SWNT film before (i) and after (ii) annealing at 500° C. for 10 min under vacuum. The inset in FIG. 10B shows the enlarged G bands of the "before" and "after" spectra.

FIG. 12A depicts FT-IR spectra of CR powder (control), pristine P2-SWNT powder and CR-SWNT films. FIG. 12B is the enlarged portion of FIG. 12A from 600 to 2000 $cm^{-1}$.

FIG. 13A is an AFM image of low density nanotubes in a SWNT film. FIG. 13B is an AFM height profile of the film shown in FIG. 13A.

DETAILED DESCRIPTION

Abbreviations and Definitions

CR=Congo red, i.e., 3,3'-([1,1'-biphenyl]-4,4'-diyl)bis(4-aminonaphthalene-1-sulfonic acid. DLS=dynamic light scattering. DMF=dimethylformamide. DMSO=dimethylsulfoxide. FT-IR=Fourier transform infrared spectroscopy. HMPA=hexamethylphosphoramide. ITO=indium tin oxide. PDMS=polydimethylsiloxane. PET=polyethylene terephthalate. SC=sodium cholate hydrate. SDS=sodium dodecyl sulfate. SEM=scanning electron microscopy, SWNT=single-walled carbon nanotube. TCF=transparent conductive film. TCM=transparent conducting material. TEM=transmission electron microscopy. THF=tetrahydrofuran. Triton X-100-brand surfactants=polyethylene glycol p-(1,1,3,3-tetramethylbutyl)-phenyl ether-type surfactants, CAS No. 9002-93-1. UV-VIS-NIR=Ultra violet-visible-near infrared spectroscopy. "Ω/☐"=ohms per square unit, a measure of sheet resistance (as contrasted to bulk resistance).

"Polar protic solvent," explicitly includes, but is not limited to: methanol, ethanol, isopropanol, n-butanol, nitromethane, formic acid, acetic acid, and the like.

"Polar aprotic solvent," explicitly includes, but is not limited to: acetone, acetonitrile, DMF, DMSO, ethyl acetate, HMPA, THF, and the like. Polar aprotic solvents lack an acidic hydrogen group and generally have a dipole moment of about 1.8 D or larger. The preferred polar aprotic solvents for use in the present disclosure have a dipole moment greater than about 2.8 D.

"Substrate" as used herein is to be interpreted broadly to include any suitably robust, flexible or inflexible panel, sheet, rod, bead, particle, etc. Glass substrates (planar slides or curved surface, bulk or particulate) are included in the definition, along with polymeric substrates (flexible or inflexible).

Figure 1A:
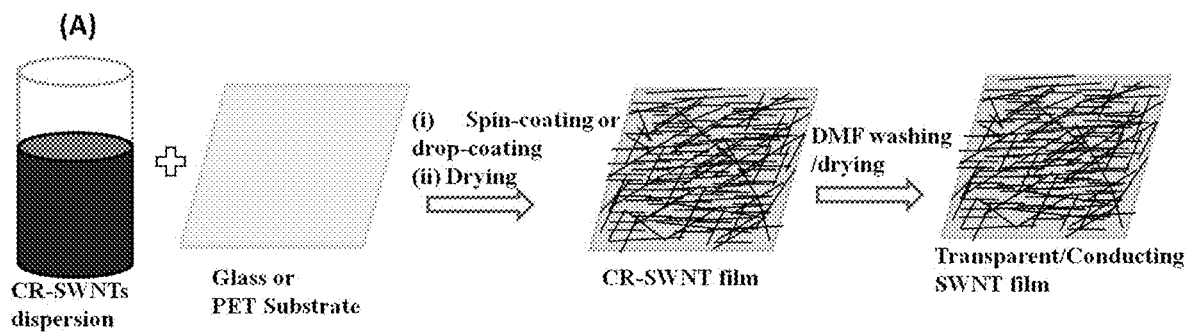
FIG. 1A is a schematic representation of transparent-conducting SWNT thin film preparation with the aid of CR.
Figure 1B:
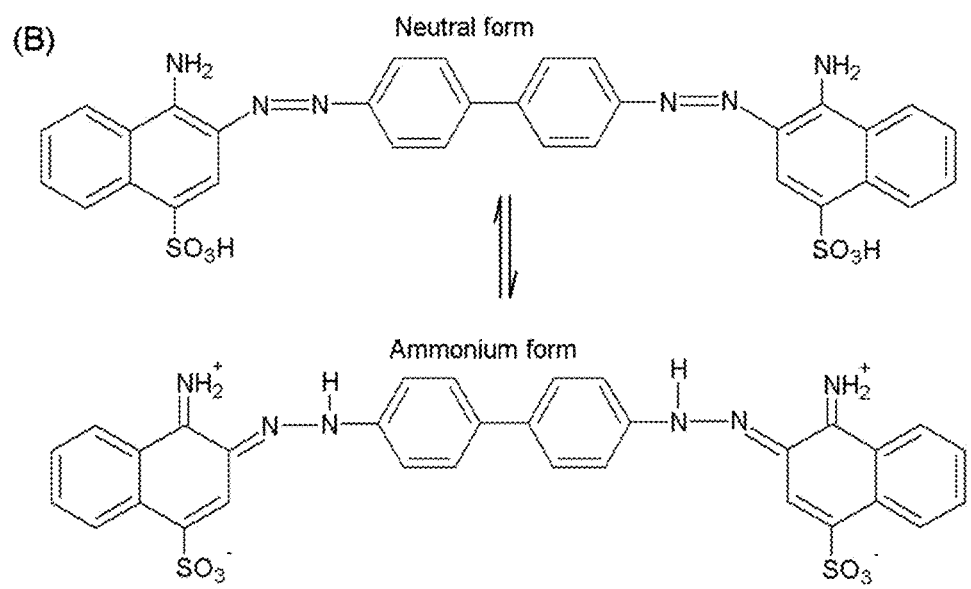
FIG. 1B is a chemical structural formula of CR in its neutral form and its ammonium resonance structure.

Flexible, Single-Walled Carbon Nanotube Films:

The steps to prepare CR-SWNT films as disclosed herein are depicted schematically in FIG. 1A. As shown in the figure, a SWNT film was prepared on a glass substrate by a drop-coating method using an aqueous solution of Congo red in which carbon SWNTs were dispersed. Spin-coating may also be used. The film was then dried and washed with DMF to yield a transparent conducting film on the glass substrate. See the Examples for details. FIG. 1B depicts the neutral and ammonium forms of CR. SWNT films prepared using SWNT dispersions in CR/water, sodium dodecylsulfate (SDS), and Triton X-100-brand surfactant are compared in FIGS. 2A, 2B, and 2C, respectively. After oven-drying for one hour at 60° C., the SWNTs dispersed in CR formed uniform thin films.

See the right-hand panel in FIG. 2A. In contrast, the SWNTs dispersed in SDS (FIG. 2B) and Triton X-100-brand surfactant (FIG. 2C) were far more aggregated. By adjusting the concentration of SWNTs in CR solution, it was possible to prepare SWNTs network films of different tube densities and transparencies. Again, see the Examples for complete details.

Figure 9A:
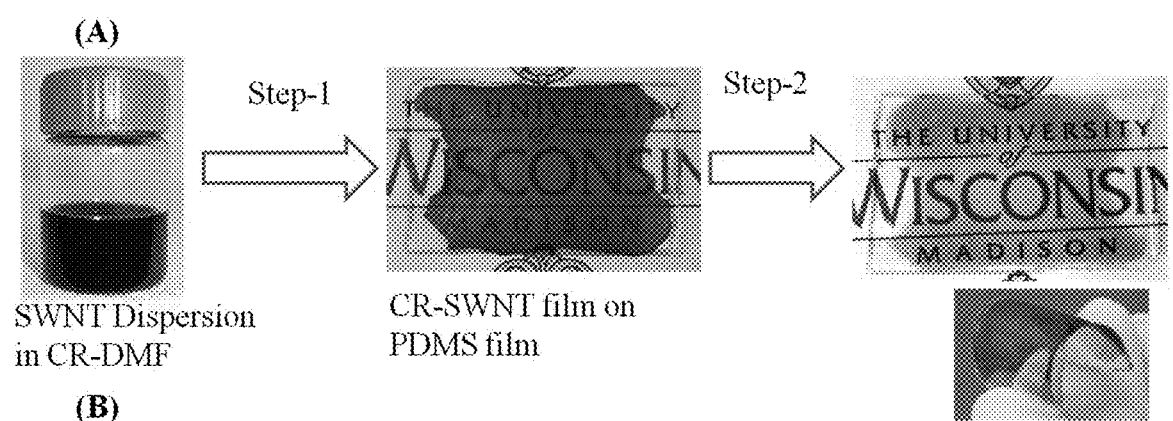
FIG. 9A is a photographic series depicting preparation of SWNT films on PDMS film using drop-coating of CR-SWNT/DMF dispersion.
Figure 9B:
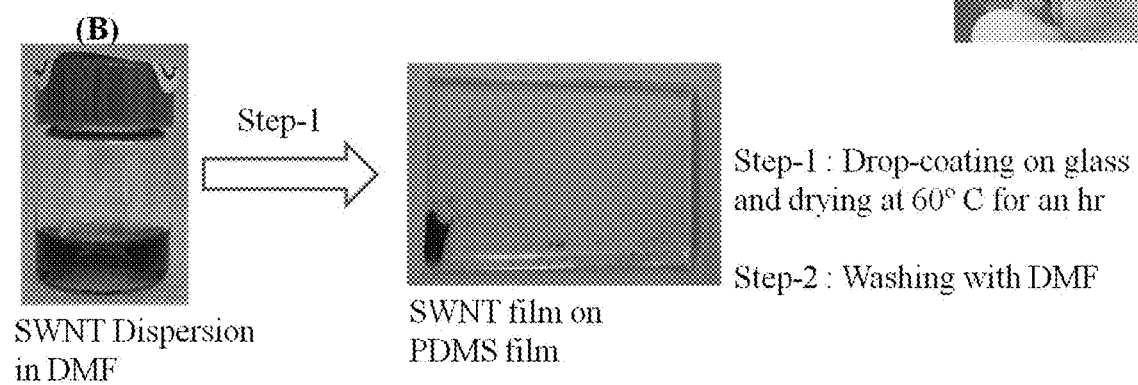
FIG. 9B is a photographic series depicting preparation of SWNT films on PDMS film using drop-coating of SWNT/DMF dispersion.

An attempt was made to disperse SWNTs in DMF and CR/DMF solution because CR is soluble in DMF (as well as in other organic polar protic and polar aprotic solvents). A stable dispersion of CR-SWNT in DMF was obtained with high concentration of SWNTs. However, SWNT were also dispersable in DMF alone with low amount of SWNTs. An attempt was also made to prepare SWNT film on polydimethylsiloxane (PDMS) film by drop-coating. CR-SWNT-DMF dispersion was uniformly dried without any aggregation on the PDMS film after the drying process at 60° C. See FIG. 9A. SWNT film preparation, however, was not successful from SWNT-DMF dispersion alone. In the absence of the CR, the SWNT did not disperse into a uniform film. Serious aggregation occurred when the substrate was dried at 60° C. See FIG. 9B.

Figure 4A:
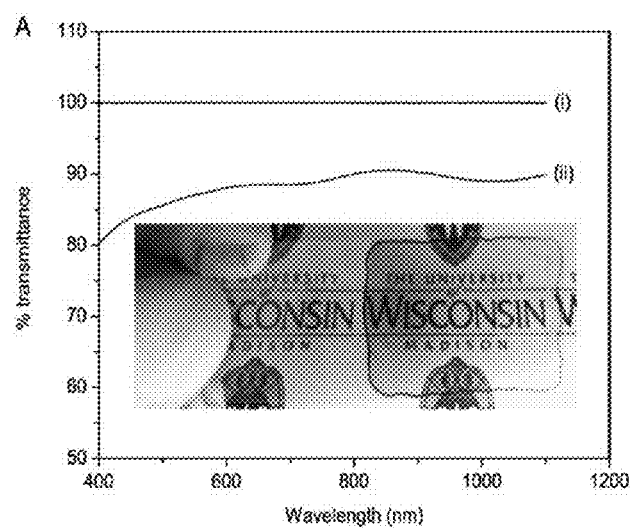
FIG. 4A depicts UV-VIS-NIR spectra of transparent SWNT film-coated glass electrodes. The inset in FIG. 4A shows SWNT film-coated glass electrodes.

The consistencies of the CR solution and CR-SWNTs dispersion were gel-like compared to the SWNTs dispersions in SDS and Triton-X-100-brand surfactant, which were liquid-like. This behavior was clearly observed by inverting the centrifuge tubes containing those dispersions. See FIG. 3A. UV-VIS spectra of CR solution and CR-SWNTs showed a strong red-shift for the CR-SWNTs dispersion. See FIG. 3B. The absorption peak shift from 496 nm to 535 nm indicates strong charge-transfer between CR and SWNTs in aqueous solution. To verify non-covalent interaction between SWNTs and CR, Raman spectra of CR-SWNTs film, CR powder and pristine SWNTs were measured using a 633 nm excitation laser source. The results are presented in FIG. 3C. Comparing the spectrum of CR-SWNTs film with that of pristine SWNTs, it can be seen that the $G^+$ band shifted from 1591 to 1596 $cm^{-1}$ and $G^-$ band decreased substantially, both of which are related to strong electron charge transfer from CR to SWNTs. See FIGS. 3C and 10A. (FIG. 3C and FIG. 10A)[18, 19]. Raman peaks of CR are also present in the CR-SWNTs film even after repeated washing with DMF and ethanol, which further confirmed strong non-covalent binding between CR and the nanotubes. However, the CR peaks disappeared when the CR-SWNTs film was thermally annealed at 500° C. in a vacuum furnace for 10 min. However, the disorder (D) band (at 1312 $cm^{-1}$) slightly increased. See FIG. 10B, curve ii. This is attributed to covalent reaction on the nanotubes by radicals generated from CR at high temperature. To avoid covalent functionalization, the thermal annealing of CR-SWNT film was limited to 5 min. This resulted in decreased contact resistance and yielded SWNTs films with sheet resistivity of 533Ω/□ at a transmittance of 87%. See FIG. 4A which is a photograph of the resulting film superimposed on its transmission spectrum.

Figure 4B:
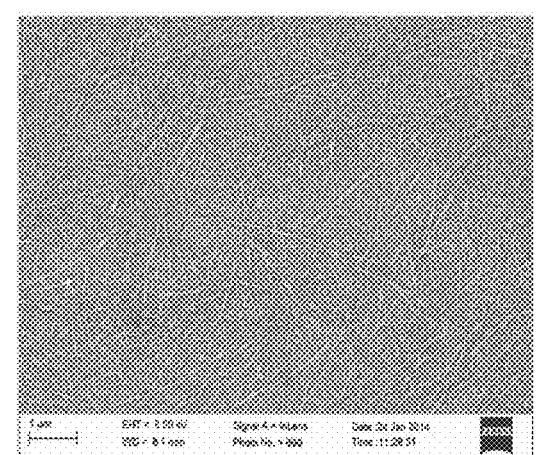
FIG. 4B depicts a SEM image of the SWNT thin film on the substrate at approximately 1 micrometer resolution.
Figure 4C:
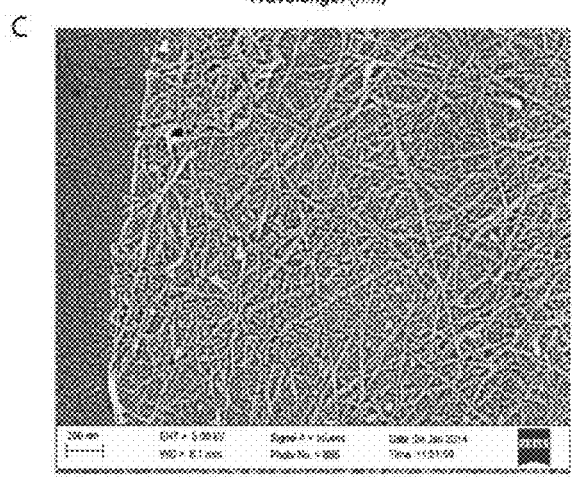
FIG. 4C depicts a SEM image of the SWNT thin film on the substrate at approximately 200 nm resolution.
Figure 4D:
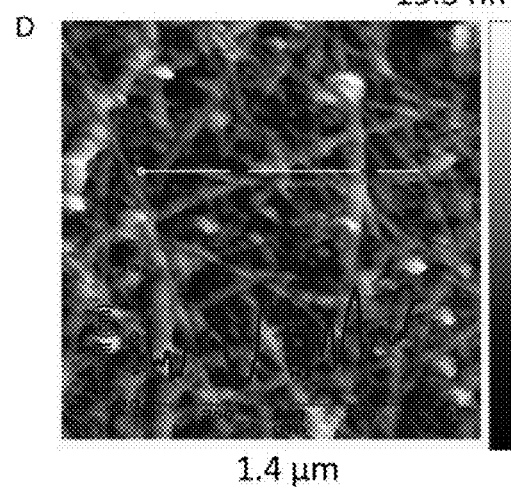
FIG. 4D depicts an AFM image of the SWNT thin film on the substrate.

The SWNTs films were further characterized using scanning electron microscopy (SEM) and atomic force microscopy (AFM), which shows dense and uniform network of SWNTs forming 20-nm thick film on the substrate. Representative SEM photomicrographs at different resolutions are shown in FIGS. 4B (scale bar=1 μm) and 4C (scale bar=1 nm). FIG. 4D depicts an AFM image of the SWNT thin film on the substrate. The dispersion qualities of CR and SDS were determined by measuring the diameters of SWNTs in CR-SWNTs and SDS-SWNTs dispersions using transmission electron microscopy (TEM). Representative TEM photomicrographs at different resolutions are shown in FIGS. 5A (scale bar=100 nm, CR-SWNT), 5B (scale bar=200 nm, Supt-CR-SWNT), 5C (scale bar=20 nm, CR-SWNT bundle), and 5D (scale bar=100 nm, SWNT dispersed in SDS, control). The average diameter of SWNTs in CR dispersion (about 2 to about 7 nm) is slightly higher than in SDS dispersion (about 1.2 to about 1.5 nm). These diameter distributions compare favorably with the reported diameter distributions of SWNTs fabricated via arc-discharge [21] (The commercial SWNTs used in the photographs shown in FIGS. 5A-5D were made via using arc-discharge.)

To elucidate why CR-SWNTs dispersions yield a uniform nanotube network film on glass, PET and PDMS substrates without any surface treatment, the surface tension of the dispersions was analyzed. The meniscuses of water and CR-SWNTs were similar to each other (compare FIG. 6A, tubes "a" and "c," respectively) and different from those of CR and SDS-SWNTs dispersion (compare FIG. 6A, tubes "b" and "d," respectively). These visual observations were supported by the measured surface tension values of CR-SWNTs, which were found to be similar to that of water (72.8 dynes/cm), while the surface tensions of CR solution and SDS-SWNTs dispersion was considerably lower [22].

Figure 11:
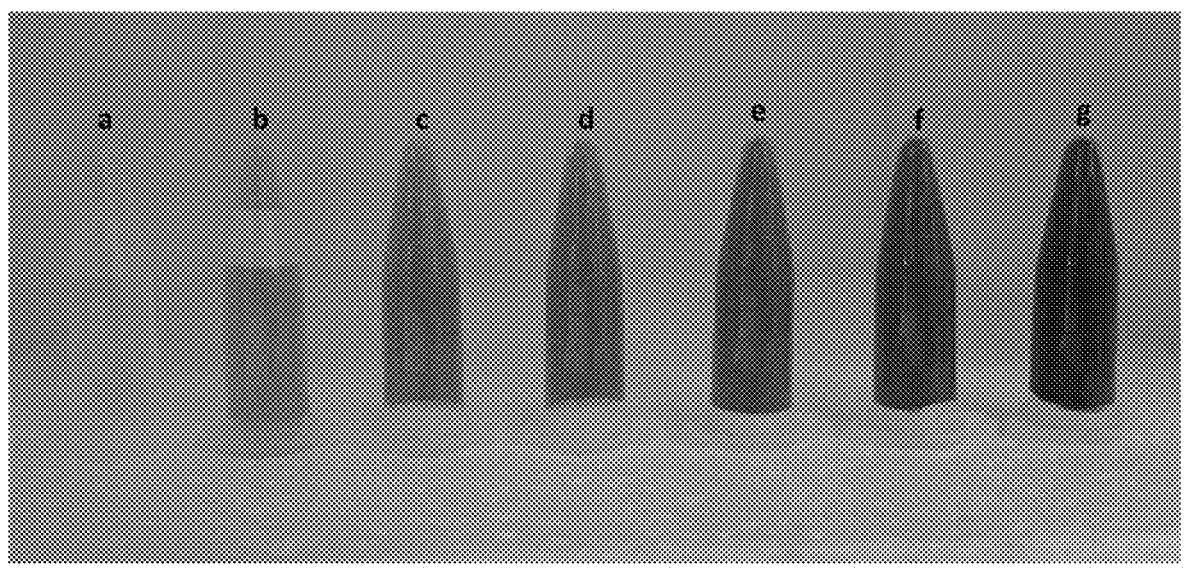
FIG. 11 is a photographic series showing different concentrations of CR solutions in water: (a)=0.0029 mM, (b)=0.0286 mM, (c)=0.0571 mM, (d)=0.0857 mM, (e)=0.1429 mM, (f)=0.2857 mM, and (g)=1 mM CR.

CR molecules could react or interact with the nanotubes by means of π-π-stacking interactions between aromatic moieties of CR and graphene. See the resonance structures of CR shown in FIG. 1B. It is also possible that there are other types of interactions through hydrogen bonds and/or electrostatic Coulomb forces [23, 24]. It is thought that hydrophobic aromatic benzene and napthalene rings (π-electrons conjugated systems) were adsorbed on the nanotubes (graphene) by π-π-stacking, and ionized amine (—$NH_2$) and sulfonic acid (—$SO_3^-$) groups were stabilizing nanotubes in the aqueous medium through the Coulombic repulsion[25]. Apparently, as shown in FIG. 11, at lower concentrations (0.0029 and 0.0286 mM) CR molecules do not interact sufficiently to form the gel-like structure that is observed at higher concentrations (≥0.0571 mM). Stopa et al. reported that CR molecules could self-aggregate (in supramolecular form) and form a ribbon-like complex or helical aggregates [26]. It is also known that the supramolecular form of CR adheres strongly to hydrophobic proteins [27].

The distribution of the hydrodynamic radius (size) distribution of nanotubes in different surfactants (see FIGS. 7A, 7B, and 7C) were measured using dynamic light scattering (DLS) method which show that the mean particle size was larger in CR-SWNTs dispersion (104 nm, FIG. 7A) than in SC-SWNTs (FIG. 7B) and SDS-SWNTs dispersions (FIG. 7C) (70 nm and 75 nm, respectively). Note that these particle sizes represent the hydrodynamic radius (diameter) of nanotubes plus any adhering surfactant film. Moreover, these large diameter nanotube sizes (in CR dispersion) indicate that nanotubes are still in bundles and are covered with the supramolecular structure of CR molecules. The amine and sulfonic acid groups would interact with the surface of the substrate that could form a uniform of SWNTs film during the drying process (without any additional surface treatment). In addition, CR molecules are adsorbed on the nanotubes by non-covalent interaction, as shown in Raman spectra, so that CR molecules were removable by washing with DMF and ethanol; see FIG. 3C.

The interaction between CR and SWNTs was also confirmed by FTIR. The IR spectra of pristine SWNTs are depicted in FIG. 12A and FIG. 12B. These spectra are similar to those previously reported [28, 29]. These spectra did not show any distinct features in the range of 600 to 4000 $cm^{-1}$ possibly due to the high quality of the nanotubes. The FT-IR spectrum of CR shows a broad and strong absorption band at 3464 $cm^{-1}$ (N—H bonds), with several other peaks at 1042, 1176 (the stretching vibration of S=O due to —$SO_3^-$), 1597 (assigned to stretching vibration of —N=N— bond), 1364 and 1227 $cm^{-1}$ (the stretching vibrations of =C—N= group adjacent to aromatic ring). Other bands located at 904, 832, 749 and 697 $cm^{-1}$ are assigned to the aromatic rings (C—H) of CR. A significant band was observed in the spectrum for CR-SWNTs film. Again, see FIGS. 12A and 12B. New bands provide evidence for the presence of functional groups definitely bound to the nanotubes. The S=O stretching vibration observed in CR spectrum is still present in CR-SWNTs, shifted to a lower wavenumber of 1030 $cm^{-1}$. The red shift might be attributed to the π-π stacking between SWNTs and CR molecules.

SWNTs films were prepared on PET substrates by spin-coating of CR-SWNTs dispersion and washing the treated substrates with DMF and ethanol. The films were transparent and conductive with a sheet resistance of 600Ω/□ at 82% transmittance. See FIGS. 6B (a photograph of the resulting film) and 6C (resistivity of the film versus bending cycle). To increase their conductivity, the CR-SWNTs dispersion was ultrasonicated prior to the spin-coating to debundle the nanotubes. The effect of the SWNTs density on the conductivity of the SWNTs film was studied by AFM. Films with low density of nanotubes were also prepared using the same CR-SWCNTs dispersion for comparison. See the AFMs in FIG. 4D and FIGS. 13A and 13B. The sheet resistance of the low density (16 nanotubes/$μm^2$) films (1.56 kΩ/□ at 90% transmittance) is higher than that of the high density (>50 nanotubes/$μm^2$) films (600Ω/□ at 82% transmittance). See FIG. 8 for transmittance data. The hydrophobicity of the film was studied after drying under flow of nitrogen. The CR-SWNTs films prepared as described herein showed highest contact angle values of ~100. See FIG. 6D. The superhydrophobicity of CR-SWNTs film is more suitable for flexible electronic display applications.

Figure 8:
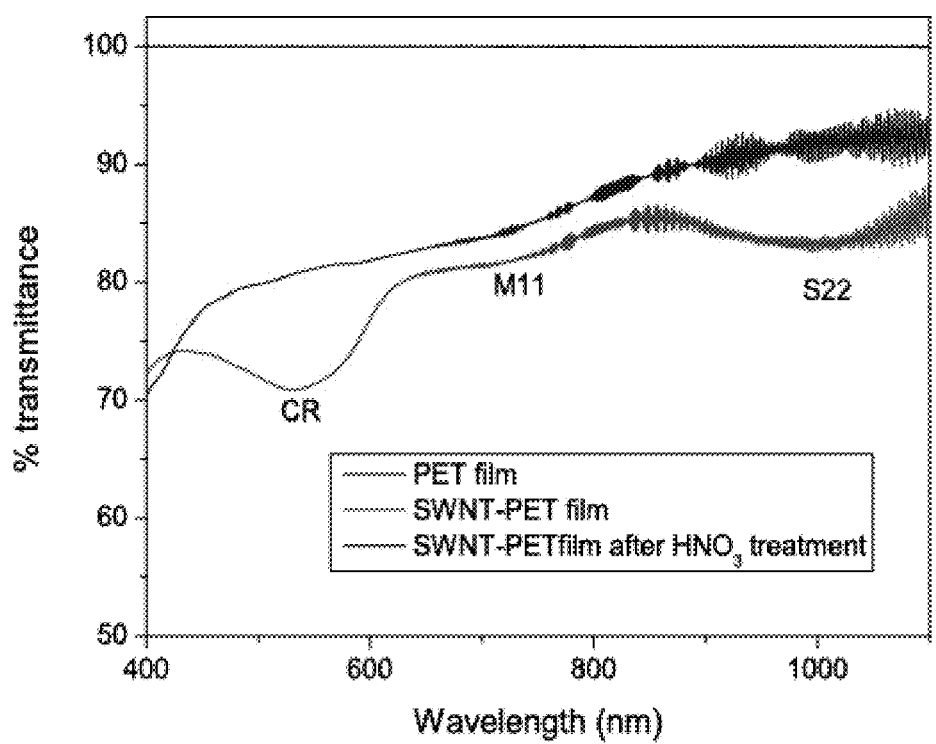
FIG. 8 is a transmittance graph of PET (black curve), CR-SWNT-PET (red curve) and SWNT-PET (after $HNO_3$ treatment) (blue curve).

FIG. 6C shows the variations of the sheet resistivity versus the bending cycles of the SWNTs-PET films. The changes in the resistance are not significant up to about 1000 consecutive bending cycles, which demonstrates the high flexibility of the SWNTs TCF films. The CR-SWNTs film were immersed in concentrated nitric acid solution for 3 h at room temperature. The UV-vis-NIR optical transmittance spectra of the SWNT films before and after $HNO_3$ treatments are shown in FIG. 8. After the treatment, CR molecules are completely removed by washing with ethanol and water (FIG. 8, blue curve). The absorption intensity of the interband energetic transition S22 and M11 of SWNTs are almost bleached off by the acid treatment which shows acid doping effect [32]. The sheet resistivity of the SWNTs-PET film was 300Ω/□ which is better than that of untreated CR-SWNTs films (600Ω/□).

These results reveal that the sheet resistivity and transparency properties of the SWNTs films disclosed herein are as good as or better than those obtained via other reported methods. Moreover, the disclosed method using CR as surfactant is easily implemented, inexpensive, and the film can be cast on any rigid or flexible substrate without surface treatment by either drop-coating or spin-coating. Superhydrophobicity, high flexibility, and low cost of production of the CR-SWNTs films make them well-suited for electronic and indium-free electrode applications.

Examples

The following examples are included solely to provide a more complete description of the films and methods disclosed herein. The examples are not intended to limit the scope of the claims in any fashion.

P2-SWNTs were purchased from Carbon Solutions, Inc (Riverside, Calif., USA). CR, sodium dodecyl sulfate (SDS), sodium cholate hydrate (SC), Triton™ X-100-brand surfactant, ethanol and dimethylformamide (DMF) were received from Sigma-Aldrich (St. Louis, Mo., USA). All other reagents were of analytical grade and used without further purification. Deionized water with resistivity of 18 MΩcm was used.

Preparation of CR-SWNT Dispersion:

P2-SWNTs (5 mg) were mixed in CR solution (10 mL, 1 mM) and then bath sonicated for 10 min. Subsequently, CR-SWNT mixture was ultrasonicated with a 130-W ultrasonic processor for one hour. Finally, CR-SWNTs dispersion was transferred into centrifuge tubes and centrifuged at 12,000 rpm for one hour. After centrifugation, the top supernatant solution was collected and stored for characterization and applications studies. For comparison studies, pristine P2-SWNTs were similarly dispersed in SDS, SC and Triton X-100-brand surfactant dispersions and supernatant SWNTs were collected after centrifugation.

SWNTs-Based TCF Preparation:

SWNTs films were prepared on glass substrate or polyethylene terephthalate (PET) film by spin-coating or drop-coating of CR-SWNTs dispersion. SWNT-coated substrate was dried at 60° C. for one hour and then washed with DMF and ethanol multiple times. Finally, SWNT-coated substrates were dried at 60° C. for several hours. For drop-coating, CR-SWNTs dispersion or SDS-SWNTs or Triton X-100-brand-SWNTs dispersion was uniformly spread onto the substrate and dried at 60° C. in an air oven. All other steps were similar to that followed for spin-coating method.

Characterization of CR-SWNTs: SWNTs films were characterized using a scanning electron microscope (SEM) (Leo 1530 Field Emission SEM), LabRAMAramis Horiba JobinYvon Confocal Raman Microscope, and Bruker AFM microscopes. Dynamic light scattering (DLS) analysis were performed using 90 Plus Particle size analyzer (Brookhaven Instruments). PerkinElmer UV/vis spectrophotometer (Lambda 25) and PerkinElmer Spectrum 100 FT-IR spectrometer (with Universal ATR Sampling accessory) were used for characterizing SWNTs. SCS Speciality Coating Systems (6800 Spin Coater Series) was used to spin-coat nanotubes. CR-SWNTs dispersion was centrifuged using Eppendorf centrifuge model no. 5415C. Contact angle measurements were done using a Dataphysics OCA 15 Optical Contact Angle Measuring System. The van der Pauw method was employed to measure resistivity of the SWNTs films using four point-probe measurement system. (van der Pauw, L. J. (1958) "A method of measuring the resistivity and Hall coefficient on lamellae of arbitrary shape," Philips Technical Review 20:220-224.)

REFERENCES CITED

[1] K. Ellmer, Past achievements and future challenges in the development of optically transparent electrodes, Nature Photonics 6 (2012) 808.

[2] D. Angmo, F. C. Krebs, Flexible ITO-Free Polymer Solar Cells, Journal of Applied Polymer Science 129 (2013) 1.

[3] J. Lewis, Material challenge for flexible organic devices, Materials Today 9 (2006) 38.

[4] Q. F. Liu, T. Fujigaya, H. M. Cheng, N. Nakashima, Free-Standing Highly Conductive Transparent Ultrathin Single-Walled Carbon Nanotube Films, Journal of the American Chemical Society 132 (2010) 16581.

[5] X. N. Ho, J. Wei, Films of Carbon Nanomaterials for Transparent Conductors, Materials 6 (2013) 2155.

[6] M. F. L. De Voider, S. H. Tawfick, R. H. Baughman, A. J. Hart, Carbon Nanotubes: Present and Future Commercial Applications, Science 339 (2013) 535.

[7] D. S. Hecht, L. B. Hu, G. Irvin, Emerging Transparent Electrodes Based on Thin Films of Carbon Nanotubes, Graphene, and Metallic Nanostructures, Advanced Materials 23 (2011) 1482.

[8] S. B. Yang, B. S. Kong, D. H. Jung, Y. K. Baek, C. S. Han, S. K. Oh, H. T. Jung, Recent advances in hybrids of carbon nanotube network films and nanomaterials for their potential applications as transparent conducting films, Nanoscale 3 (2011) 1361.

[9] S. Park, M. Vosguerichian, Z. A. Bao, A review of fabrication and applications of carbon nanotube film-based flexible electronics, Nanoscale 5 (2013) 1727.

[10] E. E. Tkalya, M. Ghislandi, G. de With, C. E. Koning, The use of surfactants for dispersing carbon nanotubes and graphene to make conductive nanocomposites, Current Opinion in Colloid & Interface Science 17 (2012) 225.

[11] J. H. O, Y. S. Kim, K. H. Koh, S. Lee, Fabrication of transparent single wall carbon nanotube films with low sheet resistance, Journal of Vacuum Science & Technology B 26 (2008) 851.

[12] M. H. A. Ng, L. T. Hartadi, H. Tan, C. H. P. Poa, Efficient coating of transparent and conductive carbon nanotube thin films on plastic substrates, Nanotechnology 19 (2008).

[13] T. P. Tyler, R. E. Brock, H. J. Karmel, T. J. Marks, M. C. Hersam, Electronically Monodisperse Single-Walled Carbon Nanotube Thin Films as Transparent Conducting Anodes in Organic Photovoltaic Devices, Advanced Energy Materials 1 (2011) 785.

[14] R. C. Tenent, T. M. Barnes, J. D. Bergeson, A. J. Ferguson, B. To, L. M. Gedvilas, M. J. Heben, J. L. Blackburn, Ultrasmooth, Large-Area, High-Uniformity, Conductive Transparent Single-Walled-Carbon-Nanotube Films for Photovoltaics Produced by Ultrasonic Spraying, Advanced Materials 21 (2009) 3210.

[15] H. Jung, J. S. Yu, H. P. Lee, J. M. Kim, J. Y. Park, D. Kim, A scalable fabrication of highly transparent and conductive thin films using fluorosurfactant-assisted single-walled carbon nanotube dispersions, Carbon 52 (2013) 259.

[16] S. De, P. E. Lyons, S. Sorel, E. M. Doherty, P. J. King, W. J. Blau, P. N. Nirmalraj, J. J. Boland, V. Scardaci, J. Joimel, J. N. Coleman, Transparent, Flexible, and Highly

[17] S. B. Yang, B. S. Kong, H. T. Jung, Multistep Deposition of Gold Nanoparticles on Single-Walled Carbon Nanotubes for High-Performance Transparent Conducting Films, Journal of Physical Chemistry C 116 (2012) 25581.
[18] J. Li, Y. Huang, P. Chen, M. B. Chan-Park, In Situ Charge-Transfer-Induced Transition from Metallic to Semiconducting Single-Walled Carbon Nanotubes, Chemistry of Materials 25 (2013) 4464.
[19] A. K. Sundramoorthy, S. Mesgari, J. Wang, R. Kumar, M. A. Sk, S. H. Yeap, Q. Zhang, S. K. Sze, K. H. Lim, M. B. Chan-Park, Scalable and Effective Enrichment of Semiconducting Single-Walled Carbon Nanotubes by a Dual Selective Naphthalene-Based Azo Dispersant, Journal of the American Chemical Society 135 (2013) 5569.
[20] L. Vaisman, H. D. Wagner, G. Marom, The role of surfactants in dispersion of carbon nanotubes, Advances in Colloid and Interface Science 128-130 (2006) 37.
[21] H.-J. Shin, S. M. Kim, S.-M. Yoon, A. Benayad, K. K. Kim, S. J. Kim, H. K. Park, J.-Y. Choi, Y. H. Lee, Tailoring Electronic Structures of Carbon Nanotubes by Solvent with Electron-Donating and -Withdrawing Groups, Journal of the American Chemical Society 130 (2008) 2062.
[22] V. Sa, K. G. Kornev, Analysis of Stability of Nanotube Dispersions Using Surface Tension Isotherms, Langmuir 27 (2011) 13451.
[23] F. H. Li, Y. Bao, J. Chai, Q. X. Zhang, D. X. Han, L. Niu, Synthesis and Application of Widely Soluble Graphene Sheets, Langmuir 26 (2010) 12314.
[24] C. G. Hu, Z. L. Chen, A. G. Shen, X. C. Shen, H. Li, S. S. Hu, Water-soluble single-walled carbon nanotubes via noncovalent functionalization by a rigid, planar and conjugated diazo dye, Carbon 44 (2006) 428.
[25] S. Gotovac, C. M. Yang, Y. Hattori, K. Takahashi, H. Kanoh, K. Kaneko, Adsorption of polyaromatic hydrocarbons on single wall carbon nanotubes of different functionalities and diameters, Journal of Colloid and Interface Science 314 (2007) 18.
[26] B. Stopa, B. Piekarska, L. Konieczny, J. Rybarska, P. Spolnik, G. Zemanek, I. Roterman, M. Krol, The structure and protein binding of amyloid-specific dye reagents, Acta Biochimica Polonica 50 (2003) 1213.
[27] P. Frid, S. V. Anisimov, N. Popovic, Congo red and protein aggregation in neurodegenerative diseases, Brain Research Reviews 53 (2007) 135.
[28] W. Zhang, S. R. P. Silva, Raman and FT-IR studies on dye-assisted dispersion and flocculation of single walled carbon nanotubes, Spectrochimica Acta Part A: Molecular and Biomolecular Spectroscopy 77 (2010) 175.
[29] R. R. Nayak, K. Y. Lee, A. M. Shanmugharaj, S. H. Ryu, Synthesis and characterization of styrene grafted carbon nanotube and its polystyrene nanocomposite, European Polymer Journal 43 (2007) 4916.
[30] R. Jackson, B. Domercq, R. Jain, B. Kippelen, S. Graham, Stability of Doped Transparent Carbon Nanotube Electrodes, Advanced Functional Materials 18 (2008) 2548.
[31] F. Mirri, A. W. K. Ma, T. T. Hsu, N. Behabtu, S. L. Eichmann, C. C. Young, D. E. Tsentalovich, M. Pasquali, High-Performance Carbon Nanotube Transparent Conductive Films by Scalable Dip Coating, Acs Nano 6 (2012) 9737.
[32] H. J. Gao, R. lzquierdo, V. V. Truong, Chemical vapor doping of transparent and conductive films of carbon nanotubes, Chemical Physics Letters 546 (2012) 109.

What is claimed is:

1. A method of making a flexible, transparent, conductive film, the method comprising:
mixing single-walled carbon nanotubes into a pre-existing solution comprising a solvent selected from the group consisting of water, organic polar protic solvents, and organic polar aprotic solvents, and an azo compound selected from the group consisting of:

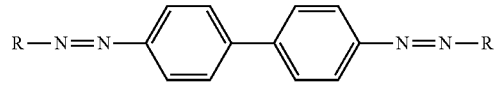

wherein each R is identical or different and each R is independently selected from the group consisting of amino-substituted phenyl and amino-substituted naphthyl;
contacting the dispersion on a substrate, and then
drying the substrate; and then
washing the substrate with a polar, aprotic solvent and an alcohol;
wherein a flexible, transparent, conductive film is formed on the substrate, and then
immersing the flexible, transparent, conductive film in a solution of concentrated acid;
wherein the single-walled carbon nanotubes are not covalently cross-linked; and
wherein the flexible, transparent, conductive film has greater than 50 nanotubes/$\mu m^2$ and a sheet resistivity of 600Ω/□ or less.

2. The method of claim 1, comprising contacting the dispersion on a flexible substrate.

3. The method of claim 1, comprising contacting the dispersion on a flexible substrate selected from the group consisting of PET and PDMS.

4. The method of claim 1, comprising contacting the dispersion on a glass substrate.

5. The method of claim 1, wherein the azo compound comprises at least two azo moieties.

6. The method of claim 1, wherein the azo compound comprises at least one sulfonic acid moiety.

7. The method of claim 1, wherein the azo compound comprises at least two sulfonic acid moieties.

8. The method of claim 1, wherein at least one R is further substituted with at least one sulfonic acid moiety.

9. The method of claim 1, wherein the azo compound is 3,3'-([1,1'-biphenyl]-4,4'-diyl)bis(4-aminonaphthalene-1-sulfonic acid (Congo red).

* * * * *